S. W. SMITH.
Ice Cream Freezer.
No. 23,271.
Patented March 15, 1859.
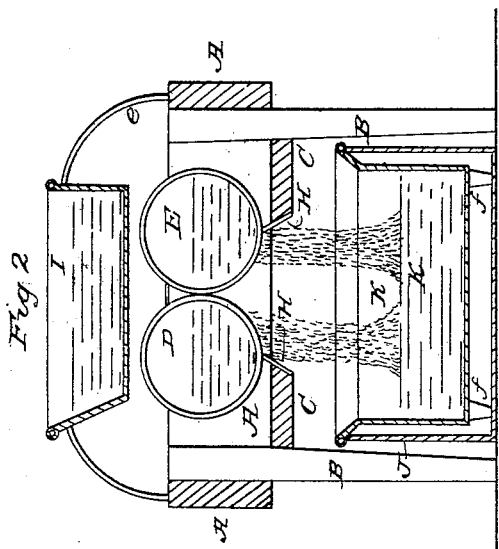
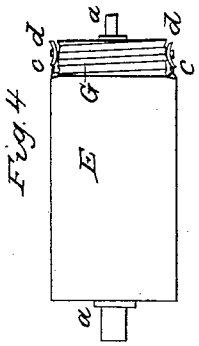
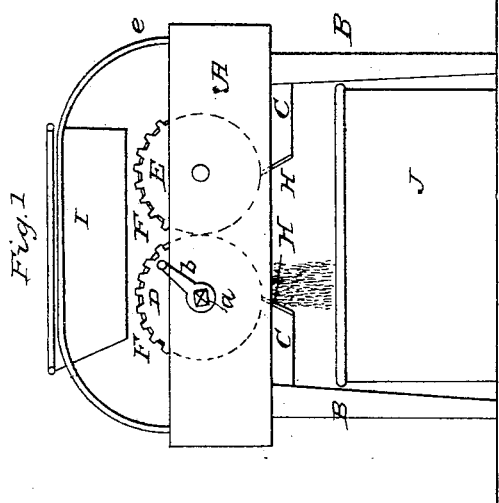
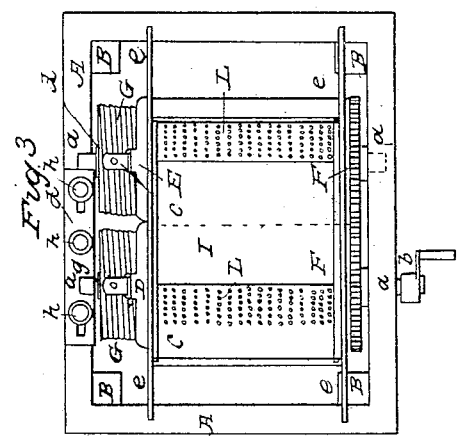
Witnesses
Inventor
Stephen Wm Smith

UNITED STATES PATENT OFFICE.

STEPHEN WM. SMITH, OF BROOKLYN, NEW YORK.

MACHINE FOR FREEZING CREAM, &c.

Specification of Letters Patent No. 23,271, dated March 15, 1859.

*To all whom it may concern:*

Be it known that I, STEPHEN WM. SMITH, of Brooklyn, Kings county, State of New York, have invented a new and Improved Machine for Freezing Liquids; and I do hereby declare the following to be a full, clear, and exact description thereof, reference being had to the accompanying drawings, figures and letters of reference thereon, making part of this specification.

Of the said drawings Figure 1, is a side elevation of the machine. Fig. 2, is a vertical section of the same. Fig. 3, is a top view. Fig. 4, shows a cylinder for holding refrigerating material.

Similar letters of reference indicate like parts in all the drawings.

The nature of one part of my invention consists in the employment and use of cylinders provided with refrigerating material and working against each other to decrystallize the frozen cream or other material by its passage between the cylinders, and combining therewith scrapers to remove the cream from the cylinders and allow it to drop into the receiving reservoir below as will be more fully hereinafter set forth.

Another part of my invention consists in combining with the cylinders a perforated distributing reservoir for the purpose of passing the cream or other material in the desired quantities to the cylinders as will be more fully set forth and explained hereafter.

To enable others skilled in the art to make and use my invention I will proceed to describe its construction and operation.

A A, represents the frame which is secured upon legs B B, and strengthened by cross bars C C.

D E, are the cylinders which are rotated together by pinions F, F, attached thereto. These cylinders are provided with shafts *a, a*, which rotate in boxes therefor in the frame, and one of them D is furnished with a winch (*b*) for propelling it. At one end of the cylinders G there are made screws threads and caps to fit them for the purpose of retaining securely the refrigerating material which is usually salt and ice. For greater security in keeping the caps tight to the cylinder they are locked by hinged pieces (*c*) fitting a pin, (*d*) as plainly shown. H H, are the scrapers which should be slotted to admit of adjustment and are secured by screws to the cross bars C C, as shown in Figs. 1 and 2. I is the distributing reservoir which is perforated (as shown in Fig. 3) (at L L) the size desired, and suspended above the cylinders on wires (*e, e*) or equivalent means. J is a vessel surrounding the receiving reservoir which is filled with refrigerating material in order to keep the cream or other material frozen which passes into the receiving reservoir K. This receiving reservoir may be of any desired mold or pattern to suit the fancy of the manufacturer.

Operation: The operation of the machine will be as follows. The cylinders are taken from the machine by moving the slide (*g*) which works on screws (*h, h*), and has a handle (*i*) for this purpose, and filled (by removing the screws G, G,) with the refrigerating material which is usually salt and ice and then replaced with their peripheries at the desired distance apart. The scrapers are then set as desired and the cream or other material is placed in the distributing reservoir which commences to drip upon the cylinders and is frozen, decrystallized by the cylinders and scraped from the cylinders and passed into the receiving reservoir K, as shown in Fig. 2. This reservoir K stands upon legs *f, f*, as shown in Fig. 2.

By this machine the cream or other material is frozen very rapidly—decrystallized by the cylinders and removed by the scrapers to the reservoir.

I would remark here that my invention will admit of changes in construction without varying in principle and I therefore do not confine myself to the precise form and shape herein set forth.

I claim:

1. As my invention the cylinders D E, in combination with the scrapers H, H, and reservoir K constructed in the manner substantially as described and for the purpose specified.

2. Combining with the cylinders a perforated distributing reservoir for the purpose of furnishing the material in the desired quantities to the cylinders and operating in the manner substantially as set forth.

STEPHEN WM. SMITH. [L. S.]

Witnesses:
C. A. DUNGIN,
A. Y. DELAHAYE.